(12) United States Patent
Spears et al.

(10) Patent No.: US 10,715,507 B1
(45) Date of Patent: Jul. 14, 2020

(54) PRIVILEGE REVOCATION FOR CLIENT DEVICES

(71) Applicant: Amazon Technologies, Inc., Seattle, WA (US)

(72) Inventors: Wesley Thomas Spears, Seattle, WA (US); Gavin Bailey, Seattle, WA (US); Nicholas George Kartsioukas, Arroyo Grande, CA (US)

(73) Assignee: Amazon Technologies, Inc., Seattle, WA (US)

( * ) Notice: Subject to any disclaimer, the term of this patent is extended or adjusted under 35 U.S.C. 154(b) by 293 days.

(21) Appl. No.: 15/863,738

(22) Filed: Jan. 5, 2018

(51) Int. Cl.
H04L 29/06 (2006.01)

(52) U.S. Cl.
CPC ............ *H04L 63/06* (2013.01); *H04L 63/105* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,850,607 | B2* | 9/2014 | Koka | G06F 21/105 726/26 |
| 2009/0217371 | A1* | 8/2009 | Desai | G06F 9/468 726/17 |
| 2011/0072522 | A1* | 3/2011 | Koka | G06F 21/105 726/31 |
| 2011/0296414 | A1* | 12/2011 | Hinojosa | G06F 9/468 718/100 |
| 2012/0204269 | A1* | 8/2012 | Gardner | G06F 21/10 726/26 |
| 2013/0111583 | A1* | 5/2013 | Hernandez | G06F 21/6218 726/21 |
| 2014/0230034 | A1* | 8/2014 | Le | H04L 63/08 726/7 |
| 2014/0289207 | A1* | 9/2014 | Moloian | G06F 21/6209 707/687 |
| 2014/0325607 | A1* | 10/2014 | Lewis | G06F 21/6218 726/4 |
| 2014/0351945 | A1* | 11/2014 | Aso | G06F 21/10 726/26 |
| 2016/0057151 | A1* | 2/2016 | Brock | G06F 16/955 726/4 |
| 2016/0112429 | A1* | 4/2016 | Sundaresan | H04L 63/08 726/4 |
| 2016/0292397 | A1* | 10/2016 | Allfrey | G06F 21/105 |

* cited by examiner

*Primary Examiner* — Malcolm Cribbs
(74) *Attorney, Agent, or Firm* — Davis Wright Tremaine LLP

(57) ABSTRACT

A privilege management system receives a manifest specifying a first set of privileges implemented on a client device. Based at least in part on a characteristic of the client device, the privilege management system identifies a second set of privileges that are to be implemented on the client device. The privilege management system processes the first set of privileges and the second set of privileges to identify a set of differences and transmits this set of differences to the client device. In response to receiving this set of differences, the client device implements the second set of privileges.

20 Claims, 8 Drawing Sheets

PRIVILEGE REVOCATION FOR CLIENT DEVICES

BACKGROUND

Businesses and other organizations often utilize client devices to support their business needs. These client devices are used by employees of these organizations, where these employees are often granted with certain privileges to perform various actions in support of these organizations' business needs. However, these privileges may be overly broad, giving users access to perform actions that they would otherwise not be permitted to perform. Further, these overly broad privileges can lead to unintended consequences, such as removal of security controls and disabling of management software used to manage networks of these organizations. Revocation of these privileges can be cumbersome and difficult, as there can be users that legitimately require these privileges for a limited time to support the organizations' business needs.

BRIEF DESCRIPTION OF THE DRAWINGS

Various techniques will be described with reference to the drawings, in which.

DETAILED DESCRIPTION

Figure 1:
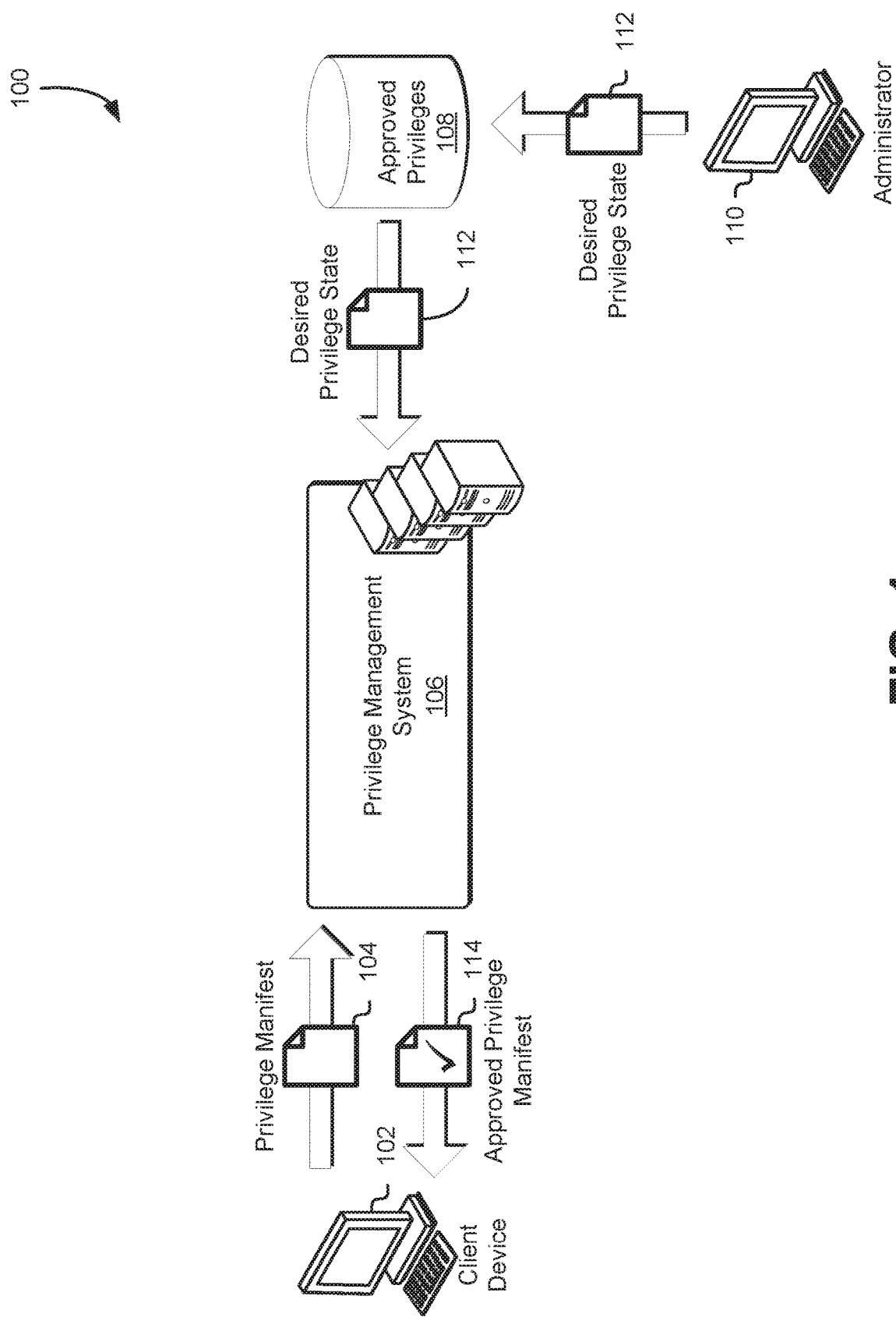
FIG. 1 shows an illustrative example of a system in which an embodiment can be implemented.

This patent disclosure relates to methods and techniques for revoking and escalating privileges for user on client devices connected to a service provider network. In one example, an administrator of a service provider transmits a set of desired privileges that are to be implemented on client devices of the administrator's enterprise network to a privilege management system. The privilege management system may determine whether the administrator is authorized to provide the set of desired privileges and to have these privileges implemented on each of the client devices of the network. In an example, if the administrator is authorized to implement the set of desired privileges, the privilege management system determines whether a threshold has been reached for requests to implement desired privileges. If the threshold has been reached, the request is added to a queue to enable an administrator of the privilege management system or of the administrator's network to evaluate the request and determine whether these privileges should be implemented. If the threshold has not been reached or the request has been approved by an administrator, the privilege management system stores the set of desired privileges in an approved privileges database, where they can be stored for implementation to the client devices.

In an example, each client device within the administrator's network includes an agent that monitors user actions on the client device and determines whether the user is authorized to perform an action requiring administrative privileges. Further, the agent transmits, to the privilege management system, a manifest specifying the administrative privileges implemented on the client device, as well as identifiers corresponding to users that have been granted these administrative privileges. In response to receiving this manifest, the privilege management system obtains, from the approved privileges database, the set of desired privileges provided by the administrator. The privilege management system compares the manifest to this set of desired privileges to identify any differences between the privileges. If there is a difference between the applied privileges on the client device and the set of desired privileges, the privilege management system transmits a new manifest to the agent specifying the set of desired privileges that should be implemented on the client device. This may cause the agent to revoke the existing privileges on the client device and implement the set of desired privileges according to the new manifest obtained from the privilege management system. In an example, the privilege management system records auditing information regarding differences between the set of desired privileges and the privileges implemented on the client device. This information is usable to identify avenues for automatic revocation of privileges for other client devices in the network.

In an example, if a user of a client device submits a request to perform an action that requires administrative privileges, the agent on the client device determines whether the user should be permitted to perform this action. The agent prompts the user to provide a rationale for which the user should be permitted to perform the requested action and transmits this rationale to the privilege management system, which may coordinate with the administrator to determine whether the user should be granted with temporary privileges to perform the action. If the user is authorized to perform the action and can be granted with the temporary privileges, the agent may elevate the user's privileges as needed to enable performance of the action. The agent may monitor the user's usage of the client device to determine whether the action has been performed and, if not, whether a timeout period has elapsed. If the timeout period has elapsed or the user has performed the requested action, the agent may revoke the temporary privileges. Further, the agent may notify the user, via an interface of the client device, that its privileges have been revoked.

In this manner, unnecessary privileges are revoked on client devices within a network and a mechanism is introduced to enable temporary privileges can be provisioned based on the needs of users of these client devices. Additionally, the techniques described and suggested herein facilitate additional technical advantages. For example, because the privilege management system stores auditing information regarding differences between desired sets of privileges and the actual privileges implemented on client devices, administrators can use this auditing information to identify vulnerabilities in their networks and on their client devices. This enables administrators to implement tailored network solutions to prevent undesired privileges from being granted to users at the onset rather than at a later time. Further, the auditing information can be used to implement machine learning techniques for automatically detecting undesired privileges implemented on client devices and revoking these privileges as they are discovered.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 shows an illustrative example of a system 100 in which an embodiment can be implemented. In the system 100, a privilege management system 106 obtains a privilege manifest 104 from a client device 102. The client device 102 may, in some instances, be a physical computing device, such as a laptop computer, a smartphone, a server in a datacenter, and the like. Alternatively, the client device 102 may be a virtual computing system instance or other virtualization of a computing platform. In an embodiment, the client device 102 serves as an endpoint within a network, whereby client devices in the network may communicate with one another and with resource services provided within the network. In an embodiment, the client device 102 includes an agent that is configured to identify a set of privileges granted to users of the client device 102. The agent installed on the client device 102 may include an application installed on the client device that executed a set of code that, as a result of being executed, monitors user accounts within the client device 102 to identify privileges granted to each user of the client device 102. In an embodiment, the agent installed on the client device 102 generates a privilege manifest 104, specifying, for each user of the client device 102, the privileges granted to the user.

In an embodiment, the agent transmits the privilege manifest 104 to a privilege management system 106 for analysis. The privilege management system 106 may comprise one or more computer systems that each include one or more processors and memory containing instructions that, if executed by the one or more processors, cause the one or more computer systems to obtain and analyze privileges applied on a client device 102 to determine whether to cause the client device 102 to revoke existing privileges and implement an alternative set of privileges. In an embodiment, the privilege management system 106 is implemented as a process, agent, or other executable code that processes incoming privilege manifests from client devices and provides an alternative set of privileges for implementation on these client devices. In another embodiment, the privilege management system 106 is implemented using other resources of a computing resource service provider or other service provider (e.g., virtual computer system instances, other computing instances, etc.).

In response to receiving a privilege manifest 104 from a client device 102, the privilege management system 106 identifies a desired privilege manifest 112 stored within an approved privileges datastore 108 that can be used to determine what privileges are to be implemented on the client device 102. For instance, the privilege manifest 104 may specify an identifier corresponding to the client device 102. The privilege management system 106 may query the approved privileges datastore 108 by using this identifier as input to identify a desired privilege manifest 112 that can be applied to the client device 102. In an embodiment, the identifier is an Internet Protocol (IP) address of the client device 102. Alternatively, the identifier may include a Universally Unique Identifier (UUID) assigned to the client device 102 that may be used to uniquely identify the client device 102 from other client devices within the network. The approved privileges datastore 108 may store desired privilege manifests 112 in association with identifiers corresponding to client devices on which the desired privilege manifests 112 are to be applied.

In an embodiment, a desired privilege manifest 112 is provided to the approved privileges datastore 108 by an administrator 110 of the network in which the client device 102 serves as an endpoint. The administrator 110 may be an individual tasked with monitoring performance of the network and the client devices that serve as the endpoints within the network. Alternatively, the administrator 110 may be an automated process, agent, or other executable code installed on a computing system configured to monitor a network and the privileges granted to users via client devices within the network. Further, the administrator 110 may be tasked with ensuring that users of these client devices are not granted overly broad privileges or are otherwise permitted to perform actions that may have a detrimental impact on the client devices and/or the network itself. In an embodiment, the administrator 110 defines a set of desired privileges that are to be implemented on one or more client devices within the network, including client device 102. These desired privileges may differ from the actual privileges granted to users via the client device 102.

The administrator 110 may submit a request to the privilege management system 106 to implement a set of desired privileges on one or more client devices, including client device 102. In an embodiment, the request to the privilege management system 106 is submitted via an application programming interface (API) call to a programmatic interface implemented by the privilege management system 106 to enable programmatic interactions, such as commands and responses by the system to those commands, between requestors and the privilege management system 106. The request may include the desired privilege manifest 112, which may specify the set of privileges that should be applied to users of the one or more client devices. Additionally, in an embodiment, the request includes credential information usable to authenticate the administrator 110 and determine whether the administrator 110 is authorized to implement the set of desired privileges specified in the desired privilege manifest 112. The credential information may include a username/password pairs, one-time passwords, cryptographic information encrypted using a cryptographic key, and the like. In an embodiment, the privilege management system 106 evaluates the credential information to determine whether the administrator 110 can be authenticated and, if so, whether it is authorized to implement the set of desired privileges specified in the desired privilege manifest 112. In an embodiment, the credential information may be subject to a rotation schedule, whereby an administrator 110 may need to create a new set of credentials that are validated by the privilege management system 106 once a rotation period has elapsed.

If the privilege management system 106 determines that the administrator 110 is authorized to cause the set of desired privileges to be implemented or otherwise approve the set of privileges, the privilege management system 106 may store the desired privilege manifest 112 within the approved privileges datastore 108 in association with the one or more client devices on to which these privileges are to be implemented. In an embodiment, the privilege management system 106 monitors administrator requests to implement a set of privileges onto client devices to determine whether the administrator 110 has breached a request threshold. For instance, administrators of the network may be subject to a limitation on the number of requests that may be submitted within a period of time for implementation of a set of desired privileges. In an embodiment, if the administrator 110 breaches the request threshold, the privilege management system 106 adds the desired privilege manifest 112 to a queue. A security service associated with the privilege management system 106 may obtain the desired privilege manifest 112 from the queue and evaluate the desired privilege manifest 112 and other information from the request to determine whether to implement the set of desired privileges specified in the desired privilege manifest 112.

In an embodiment, the desired privilege manifest 112 specifies a rationale that will be presented via the client device 102 for why the set of privileges on the client device 102 have been modified or revoked. Additionally, the desired privilege manifest 112 may specify an attribute for each user of a client device. This attribute may be used by the client device 102 or the privilege management system 106 to determine the criteria for restoring privileges to a user that requests such privileges. For instance, the administrator 110 may supply an attribute applicable to a particular user that defines a particular class of privileges that the user may be permitted to have for a limited period of time in using the client device 102. Alternatively, the attribute may define a set of actions that may be performed by a class of users (e.g., technical users, non-technical users, etc.) for which the class of users may need certain privileges in order to perform.

The privilege management system 106, in response to receiving the privilege manifest 104 from the client device 102, may compare the set of privileges granted to users of the client device 102 defined in the privilege manifest 104 to the desired set of privileges for these users defined in the desired privilege manifest 112. If the privilege management system 106 identifies a difference between the privilege manifest 104 and the desired privilege manifest 112 provided by the administrator 110, the privilege management system 106 may generate an approved privilege manifest 114 specifying the set of desired privileges that are to be implemented on the client device 102 and the privileges currently implemented on the client device 102 that are to be revoked. Further, the approved privilege manifest 114 may specify the rationale provided by the administrator 110 for revocation of privileges implemented on the client device 102. Thus, if a user of the client device 102 attempts to perform an action for which its privileges have been revoked, the client device 102 may present the administrator's rational for revocation of these privileges to the user.

In an embodiment, the privilege management system 106 records differences between a privilege manifest 104 from a client device 102 and the desired privilege manifest 112 in a data log. This data log may be provided to the administrator 110 to enable the administrator 110 to determine the proliferation of undesired privileges among the client devices in the network, including client device 102. In some instances, the privilege management system 106 uses the data logs generated during each comparison to determine the proliferation of undesired privileges and, based at least in part on this proliferation of undesired privileges, recommendations for preventing the implementation of undesired privileges on the client devices within the network. In an embodiment, the privilege management system 106 uses the data logs as input into a machine learning algorithm to automatically identify privileges from other client devices that are to be revoked. Thus, if at a later time, the privilege management system 106 identifies one or more privileges in the privilege manifest 104 that do not conform with a privilege model generated using the machine learning algorithm and the data logs, the privilege management system 106 may revoke these one or more privileges without need to obtain a desired privileges manifest 112 from the approved privileges datastore 108.

A machine learning algorithm may, at any time, utilize one or more sample vectors to perform one or more simulations to determine whether the processing of the data logs results in correct and accurate results and/or to refine the one or more functions utilized by the privilege management system 106 to produce correct and accurate results. For instance, during initialization of the machine learning algorithm, the privilege management system 106 may provide the machine learning algorithm with one or more sample vectors and analytical results (e.g., desired outcomes) that should be obtained based at least in part on these one or more sample vectors. The machine learning algorithm, based at least in part on this exercise, may adjust the functions utilized by the privilege management system 106 to analyze the data logs.

The machine learning algorithm may receive input from one or more analysts employed by a service provider to analyze the results from the one or more analyses performed by the privilege management system 106 through use of the one or more functions described above. For instance, an analyst may review the data logs to determine whether one or more privileges have been revoked appropriately. The analyst may provide his/her input for use in refining a function used to classify vector input as corresponding to compliant or non-compliant revocation of privileges. In an embodiment, the one or more analysts are computer systems configured to perform the aforementioned operations. The vector of measurements corresponding to the review performed by the analyst and the desired outcome corresponding to the analyst's input may be used by the machine learning algorithm to update the function used to classify vector inputs. Such may be performed by multiple analysts and/or using multiple vector inputs to provide the machine learning algorithm a sufficient number of sample vector inputs and desired outputs. The machine learning algorithm may adjust the one or more functions used by the privilege management system 106 to increase the likelihood that the desired result is obtained in future analyses.

The function used to classify vectors may vary in accordance with various embodiments. For example, in some embodiments, support vector machine techniques are used to classify regions in Euclidean space as compliant or non-compliant so that data in the data logs are classified in accordance with the region in which the measurement vectors fall. In yet another embodiment, the machine learning algorithm can utilize decision tree learning to determine a decision (classification, regression) tree used to classify vector input as compliant or non-compliant.

In response to receiving the approved privilege manifest 114 from the privilege management system 106, the agent on the client device 102 may implement the set of privileges specified in the approved privilege manifest 114 while revoking other privileges either omitted from the approved privilege manifest 114 or indicated in the approved privilege manifest 114 as being revoked. In an embodiment, if a user of the client device 102 attempts to perform an action requiring one or more revoked privileges, the agent on the client device 102 provides, via an interface of the client device 102, a notification to the user indicating that the one or more privileges required to enable the user to perform the action have been revoked by an administrator 110 or the privilege management system 106.

In an embodiment, the agent on the client device 102 provides users of the client device 102 with an interface for requesting temporary privileges for performing certain actions on the client device 102. These temporary privileges may correspond to a set of privileges previously revoked by the agent in response to receiving the approved privilege manifest 114. Through this interface, a user may specify the action that it would like to perform and/or the privileges required to perform such an action. Further, the user may provide an explanation as to why it requires such privileges. Alternatively, the agent may evaluate the request from the user to generate an explanation as to why these privileges are required for performance of the operation. The request for temporary privileges may be catalogued for data mining purposes to drive down the necessity for these privileges further. For instance, a data log specifying requests for temporary privileges may be provided to the administrator 110, which may adjust the set of desired privileges based at least in part on these data logs. The request may be provided to the administrator 110, which may determine whether the request for temporary privileges may be fulfilled. If the administrator 110 determines that the temporary privileges may be granted, the agent on the client device 102 may enable the temporary privileges and allow the user to perform the desired actions. The request for temporary privileges may be explicit or implicit (e.g., the agent on the client device 102 detects an action by a user of the client device 102 that requires access privileges that have been previously revoked, resulting in an implication that the user requires temporary privileges to perform the action).

The temporary privileges may be subject to a time limitation whereby they are automatically revoked if a pre-defined time period has elapsed. Thus, if the user does not perform the desired action within the pre-defined time period, the agent may automatically revoke the temporary privileges. Information regarding performance of actions subject to the temporary privileges may also be recorded in a data log for use by the administrator 110 to determine whether adjustments to the set of desired privileges for the client device 102 are needed. Further, the agent may notify the user of the client device 102 of revocation of the temporary privileges once the pre-defined time period has elapsed.

Figure 2:
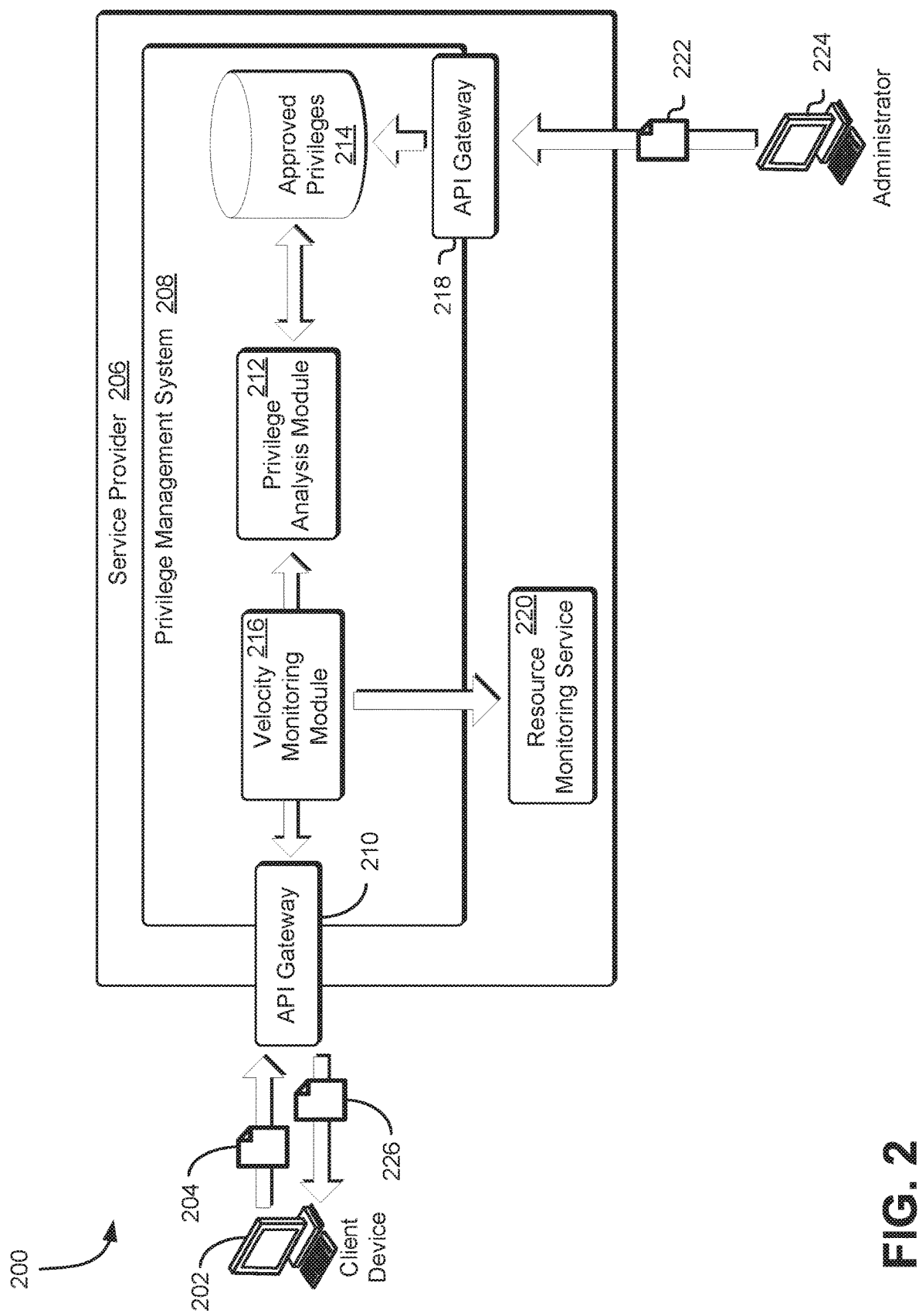
FIG. 2 shows an illustrative example of a system in which a privilege manifest from a client device is analyzed to determine whether to replace privileges of the client device with a set of desired privileges defined by an administrator in accordance with an embodiment.

FIG. 2 shows an illustrative example of a system 200 in which a privilege manifest 204 from a client device 202 is analyzed to determine whether to replace privileges of the client device 202 with a set of desired privileges defined by an administrator 224 in accordance with an embodiment. In the system 200, an agent installed on a client device 202 connects to an application programming interface (API) gateway 210 of a privilege management system 208 to transmit a privilege manifest 204 to the privilege management system 208. The API gateway 210, in an embodiment, is a computer system or a process executed on a computer system of the privilege management system 208 that routes API calls from client devices to the privilege management system 208. The API gateway 210 may expose particular API commands to the agent installed on the client device 202 to enable the agent to transmit an API call to the API gateway 210. This API call may include the privilege manifest 204, as well as other information usable to identify the client device 202 and users of the client device 202.

The privilege manifest 204 from the client device 202 may specify identifiers corresponding to users and groups that have elevated privileges on the client device 202. These elevated privileges may include administrative privileges, as well as other privileges that grant users authority to perform actions on computer hardware, operating systems, programs, and other applications on the client device 202 that other users may not be able authorized to perform. The agent installed on the client device 202 may evaluate user profiles on the client device 202 to identify the privileges provided to each user, which the agent may use to populate the privilege manifest 204. In an embodiment, the agent is configured to generate the privilege manifest 204 at regular intervals (e.g., every hour, every day, every week, etc.) or in response to a triggering event (e.g., changes to user privileges on the client device 202, a request from the privilege management system 208, etc.).

As noted above, the privilege management system 208 may comprise one or more computer systems that each include one or more processors and memory containing instructions that, if executed by the one or more processors, cause the one or more computer systems to obtain and analyze privileges applied on a client device 202 to determine whether to cause the client device 202 to revoke existing privileges and implement an alternative set of privileges. The privilege management system 208 may be provided by a service provider 206, which may provide various services to customers of the service provider 206, such as virtual computer system services, resource monitoring services (e.g., resource monitoring service 220), database services, and the like. In an embodiment, the privilege management system 208 includes a privilege analysis module 212 that receives the privilege manifest 204 from the agent installed on the client device 202. The privilege analysis module 212, in some embodiments, is an application installed on one or more computer systems of the privilege management system 208 that processes incoming privilege manifests from client devices and compares these privilege manifests to desired privilege manifests from an approved privileges datastore 214. Alternatively, the privilege analysis module 212 may be a stand-alone computer system of the privilege management system 208 that performs the aforementioned operations.

In response to receiving a privilege manifest 204 from the client device 202 via the API gateway 210, the privilege analysis module 212 may access an approved privileges datastore 214 to identify a set of desired privileges that are to be implemented on to the client device 202, as well as to identify which privileges implemented on the client device 202 should be modified or revoked. The approved privileges datastore 214 may include one or more computer systems and storage devices for storage of desired privilege manifests generated by administrators and other customers of the service provider 206. In an embodiment, the approved privileges datastore 214 maintains a database comprising key-value entries corresponding to each client device within a network defined by an administrator of the network and any desired privilege manifests that are applicable to the client device. For example, as illustrated in FIG. 2, the client device 202 may serve as an endpoint in a network managed by the administrator 224.

In an embodiment, the privilege analysis module 212 uses an identifier corresponding to the client device 202 to identify an entry within the approved privileges datastore 214 corresponding to the client device 202. If an entry is identified, the privilege analysis module 212 may determine whether a desired privilege manifest is available for the client device 202. The desired privilege manifest may specify a list of users and groups of the client device 202, as well as the desired privileges that each user and group is to have within the client device 202. In some instances, the desired privilege manifest may specify specific privileges that are to be revoked if they have been granted to users or groups of the client device 202. In response to obtaining the desired privilege manifest from the approved privileges datastore 214, the privilege analysis module 212 may compare the privilege manifest 204 from the client device 202 to the desired privilege manifest from the approved privileges datastore 214.

If the privilege analysis module 212 determines that there is a difference between the privileges granted to users and groups of the client device 202 and the desired privileges specified in the desired privilege manifest, the privilege analysis module 212 may generate an approved privilege manifest 226. The approved privilege manifest 226 may specify the privileges that are to be granted to users and groups of the client device 202, as well as any privileges that are to be revoked. The privilege analysis module 212, via the API gateway 210, may transmit the approved privilege manifest 226 to the client device 202. The agent on the client device 202 may obtain the approved privilege manifest 226 from the API gateway 210 and use the approved privilege manifest 226 to identify any differences between the privileges implemented via the client device 202 and the desired privileges specified in the approved privilege manifest 226. Based at least in part on the desired privileges specified in the approved privilege manifest 226, the agent may revoke existing privileges granted to users and groups of the client device 202 and/or implement new privileges for these users and groups.

In an embodiment, the privilege analysis module 212 records data logs for each client device specifying information regarding privilege proliferation within the client device. For example, if the privilege analysis module 212 identifies differences between privileges implemented on the client device 202 and those specified in the desired privilege manifest from the approved privileges datastore 214, the privilege analysis module 212 may record these differences in a data log. The data log, over time, may specify the frequency of privilege proliferation among users and groups of the client device 202. The privilege analysis module 212 may provide the data log to an administrator 224 of the network in which the client device 202 serves as an endpoint. In some embodiments, the privilege analysis module 212 utilizes the data log as input to a machine learning algorithm to identify privileges that are to be revoked automatically, without need to obtain the desired privilege manifest from the approved privileges datastore 214. For example, if the data log specifies that a particular privilege is consistently revoked over time, the privilege analysis module 212 may cause revocation of the privilege automatically without need to review the desired privilege manifest for the client device 202.

In an embodiment, the privilege management system 208 provides a second API gateway 218 through which administrators of a network, such as administrator 224, can provide a desired privilege manifest 222 specifying the set of privileges that should be implemented on client devices within the network. As noted above, the desired privilege manifest 222 may specify, for a client device 202, users and groups and the desired privileges that are to be granted to these users and groups. In an embodiment, an administrator 224 submits an API call to the API gateway 218, where the API call may include the desired privilege manifest 222 and credential information usable to authenticate the administrator 224 and determine whether the administrator 224 is authorized to provide the desired privilege manifest 222 and have the privileges specified therein enforced on the target client devices.

In response to receiving a desired privilege manifest 222 from an administrator 224, the API gateway 218 transmits the desired privilege manifest 222 to the approved privileges datastore 214, where the desired privilege manifest 222 is stored in association with entries corresponding to the client devices on which the privileges specified in the desired privilege manifest 222 are to be implemented. In an embodiment, requests from the administrator 224 to implement a desired privilege manifest 222 are reviewed by a policy management service or other authorization service to determine whether the administrator 224 is authorized to implement the desired set of privileges specified in the desired privilege manifest 222. If the administrator 224 cannot be authenticated and/or the administrator 224 is not authorized to implement the desired set of privileges, the policy management service or other authorization service may deny the request.

In an embodiment, once the desired set of privileges are implemented on the client device 202, a user of the client device 202 can submit a request for a set of privileges to enable performance of an operation on the client device 202. This set of privileges may have been revoked or modified as a result of implementation of the desired set of privileges from the administrator 224. The agent on the client device 202 may transmit the request to the privilege analysis module 212 to obtain a temporary set of privileges that can be implemented on the client device 202 to enable the user to perform the requested operation. This temporary set of privileges, in an embodiment, expires once a period of time defined by the privilege management system 208 has elapsed. Alternatively, the temporary set of privileges expires in response to the user having performed the requested operation.

In an embodiment, requests from users of the client device 202 to perform an operation requiring a temporary set of privileges are evaluated by a velocity monitoring module 216 to determine whether the temporary set of privileges should be implemented on the client device 202. The velocity monitoring module 216 may include a computer system of the privilege management system 208 that monitors incoming requests from users of client devices to perform one or more operations requiring implementation of temporary sets of credentials. In an embodiment, if the user of the client device 202 has submitted a number of requests for a temporary set of privileges over a period of time, the velocity monitoring module 216 determines whether the rate at which the user has submitted these requests exceeds a threshold. If the velocity monitoring module 216 determines that the rate at which the user has submitted its requests for a temporary set of privileges exceeds the threshold, the velocity monitoring module 216 transmits the requests to a resource monitoring service 220 for further evaluation. The resource monitoring service 220, in an embodiment, includes one or more computer systems of the service provider 206 that provides security and alarming services to other services provided by the service provider 206. Thus, the resource monitoring service 220 may be distinct from the privilege management system 208. In other instances, the resource monitoring service 220 may be an application, module, or process installed on a computer system of the privilege management system 208.

If a request from a user of a client device 202 is transmitted to the resource monitoring service 220, the resource monitoring service 220 may evaluate the request and determine whether the request can be processed. For example, the resource monitoring service 220 may determine whether the request originated from an Internet Protocol address of the user and, if so, direct the request to an administrator of the network to determine whether the request should be processed. If the resource monitoring service 220 rejects the request, the resource monitoring service 220 may transmit a notification to the velocity monitoring module 216 to indicate that the request should be denied. This may cause the velocity monitoring module 216 to transmit a notification to the client device 202 indicating that the request has been denied due to the call threshold having been breached. Further, the notification may indicate a time at which the user of the client device 202 may submit a new request to obtain a temporary set of privileges for performance of a requested operation.

In an embodiment, the velocity monitoring module 216 additionally monitors the rate at which administrators submit requests to implement desired set of privileges on to client devices within a network. For instance, the velocity monitoring module 216 may implement a call threshold whereby a limited number of API calls may be submitted by administrators within a period of time. If an administrator 224 breaches the call threshold (e.g., the administrator 224 submits a number of requests within a period of time that exceeds the call threshold), the velocity monitoring module 216 may transmit the request to a resource monitoring service 220 for analysis and approval.

If a request from the administrator 224 is transmitted to the resource monitoring service 220, the resource monitoring service 220 may evaluate the request and determine whether the request can be processed. Similar to the process described above, the resource monitoring service 220 may determine whether the request originated from an Internet Protocol address of the administrator 224 and, if so, direct the request to an administrator of the service provider 206 to determine whether the request should be processed. If the resource monitoring service 220 rejects the request, the resource monitoring service 220 may transmit a notification to the velocity monitoring module 216 to indicate that the request should be denied. This may cause the velocity monitoring module to transmit a notification to the administrator 224 indicating that the request has been denied.

In an embodiment, the administrator 224 is prompted to provide a justification that will be shown to users of the client device 202 via an interface as to why their privileges have been modified or revoked. Further, the administrator 224 may be prompted by the API gateway 218 to supply a level attribute usable by the privilege management system 208 to determine a set of criteria for restoring a user's privileges on the client device 202 for a limited period of time should the user require these privileges to perform an action. For instance, based at least in part on the level attribute provided by the administrator 224, the privilege management system 208 may restore a user's privileges for a limited period of time upon request, where the privileges may only allow the user to perform a limited set of actions. Once the limited period of time has elapsed, the privileges may be revoked.

If the request from the administrator 224 can be fulfilled, the desired privilege manifest 222 from the administrator 224 is added to the approved privileges datastore 214, as described above. Further, in an embodiment, the privilege analysis module 212 receives a notification from the API gateway 218 indicating addition of the desired privilege manifest 222 to the approved privileges datastore 214. This may cause the privilege analysis module 212 to transmit a request to the agent on the client device 202 to provide an updated privilege manifest 204 specifying the set of active privileges implemented on the client device 202. The privilege analysis module 212 may compare the updated privilege manifest 204 to the desired privilege manifest 222 stored in the approved privileges datastore 214 to identify any differences and generate an approved privileges manifest 226 for the agent.

Figure 3:
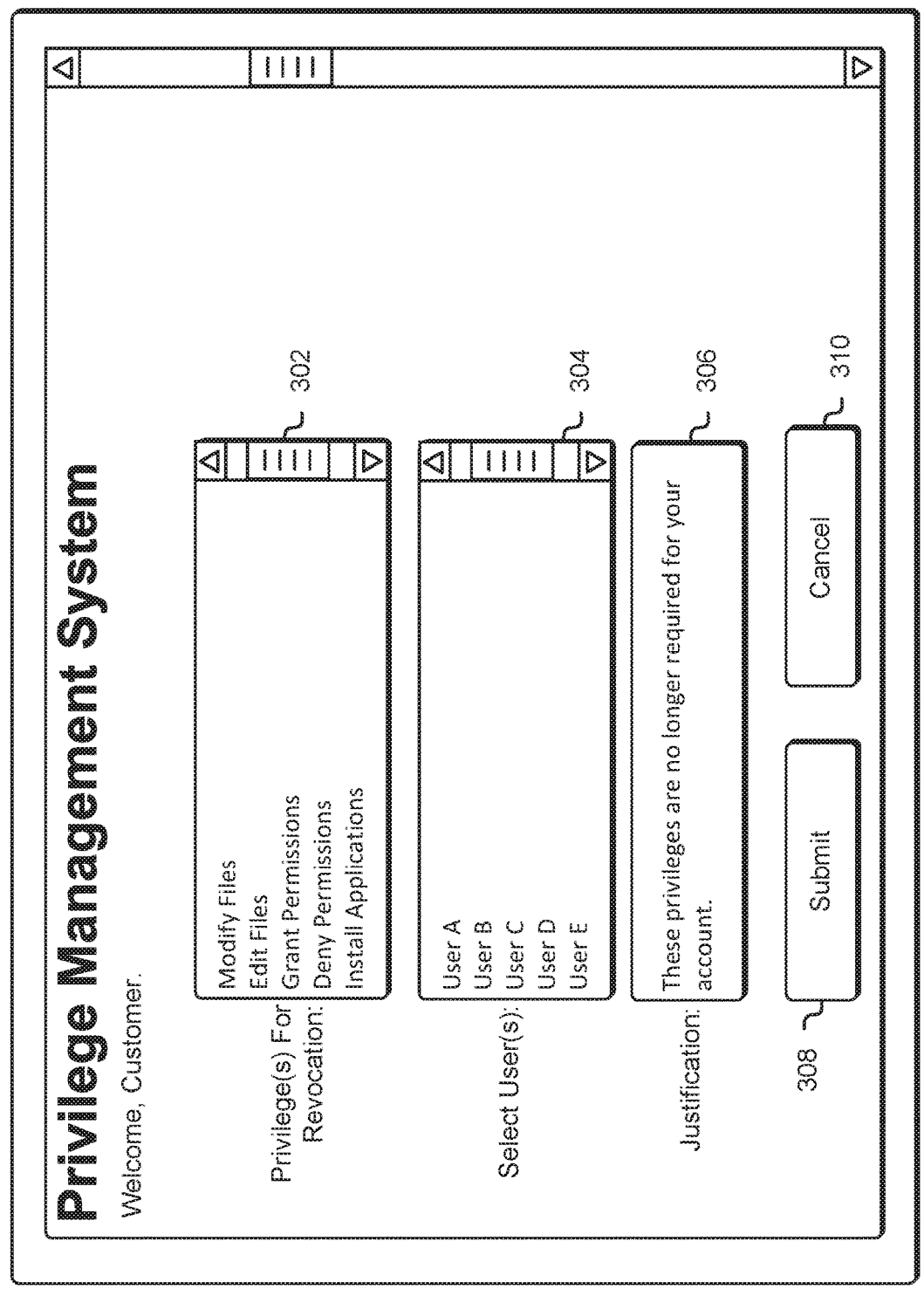
FIG. 3 shows an illustrative example of a system interface of a privilege management system usable for revocation of a set of privileges for users of a client device in accordance with an embodiment.

As noted above, an administrator of a client network may define a desired set of privileges to be implemented on various client devices that serve as endpoints of the client network. In an embodiment, the privilege management system provides the administrator with an interface through which the administrator may define the desired set of privileges to be implemented for each user of a client device. Further, via the interface, the administrator may provide a justification that is presented to users in the event that these users perform an operation subject to a privilege revoked by the administrator via submission of the desired privilege manifest. Accordingly, FIG. 3 shows an illustrative example of a system interface 300 of a privilege management system usable for revocation of a set of privileges for users of a client device in accordance with an embodiment.

In an embodiment, the system interface 300 is presented to an administrator in response to a request from the administrator to generate a desired privilege manifest or to otherwise define the desired set of privileges to be implemented on to one or more client devices of a network. The system interface 300 may include various elements through which an administrator may define the desired set of privileges to be implemented on to a client device, the target set of users for which to define this desired set of privileges, and a justification as to the modification of the existing set of privileges on the client device that may be presented to the impacted users. For example, in an embodiment, the system interface 300 includes a privilege revocation window 302. The privilege revocation window 302 may comprise a graphical control component of a graphical user interface (GUI) that specifies one or more privileges that may be implemented or revoked from a client device. For example, in an embodiment, the administrator defines via the system interface 300 the properties of the one or more client devices that are to have the desired set of privileges implemented. This may include the operating system of the client devices, any applications installed on these client devices, and any other hardware and software properties of the client devices. Based at least in part on this information, the privilege management system may identify the set of privileges that may be implemented on these client devices. These privileges may be presented to the administrator via the privilege revocation window 302.

Using the privilege revocation window 302, the administrator may select the one or more privileges that are to be revoked on the client devices. In an embodiment, the privilege revocation window 302 further enables the administrator to define a set of privileges that can be implemented for users of the client devices. For instance, if the administrator desires to implement a set of privileges for a class of users (e.g., technical users vs. non-technical users), the administrator may use the privilege revocation window 302 to select the privileges to be implemented for these users. In some instances, if the administrator does not select a particular privilege from the privilege revocation window 302, the particular privilege may be applied to the identified users.

The system interface 300 may also include a user selection window 304 through which the administrator may select the set of users that are to have the set of privileges selected via the privilege revocation window 302 revoked. The user selection window 304 may be populated by the privilege management system based at least in part on information provided by the administrator during an account creation process for the administrator. For example, to gain access to the privilege management system, the administrator may be required to provide IP addresses corresponding to the various client devices in the administrator's network. This may cause the privilege management system to query the agents installed in each of these client devices to identify the set of users that utilize each client device. Alternatively, the administrator may provide user information for each user of a client device. This information may be stored by the privilege management system and used to populate the user selection window 304. If an administrator selects a user from the user selection window, this user will have its privileges revoked according to the privileges selected in the privilege revocation window 302. It should be noted that while the user selection window 304 illustrated in FIG. 3 specifies individual user identifiers, the user selection window 304 may also specify groups of users, attributes of users, and other information that may be used to classify and identify users that are to have certain privileges revoked.

In an embodiment, the system interface 300 includes a justification window 306, through which an administrator can provide a justification for revocation of the privileges identified in the privilege revocation window 302. If the administrator supplies a justification via the justification window 306, this justification may be presented to impacted users when these users access a client device and are denied permission to perform one or more actions as a result of the identified privileges being revoked for these users. In an embodiment, the justification is also used by the velocity monitoring module and the resource monitoring service, each described above in connection with FIG. 2, to determine whether to process the desired privilege manifest generated by the administrator via the system interface 300. For example, if an administrator breaches a call threshold (e.g., the administrator submits a number of requests within a period of time that exceeds the call threshold), the velocity monitoring module may transmit the request to a resource monitoring service for analysis and approval. The velocity monitoring module may evaluate the provided justification to determine whether the request to implement the desired privilege manifest may be fulfilled.

It should be noted that while the system interface 300 illustrated in FIG. 3 includes the privilege revocation window 302, the user selection window 304, and the justification window 306, the system interface 300 may include additional components. For example, in an embodiment, the system interface 300 includes a level attribute selection window, through which the administrator can define a level attribute for the selected users. This attribute may be used by the client device or the privilege management system to determine the criteria for restoring privileges to a user that requests the privileges revoked by the administrator. For instance, the administrator may supply an attribute applicable to a particular user that defines a particular class of privileges that the user may be permitted to have for a limited period of time in using the client device. Alternatively, the attribute may define a set of actions that may be performed by a class of users (e.g., technical users, non-technical users, etc.) for which the class of users may need certain privileges in order to perform.

If the administrator has specified, through the privilege revocation window 302, the privileges that are to be revoked for the users specified in the user selection window 304, the administrator may select the submit button 308 to transmit a request to the privilege management system to generated the desired privilege manifest. This may cause the privilege management system to evaluate, via the velocity monitoring module, the desired privilege manifest to determine whether the desired privilege manifest may be added to the approved privileges datastore 214 and implemented on the target client devices. If the administrator no longer wants to create a new desired privilege manifest via the system interface 300, the administrator may select the cancel button 310 to exit the system interface 300.

Figure 4:
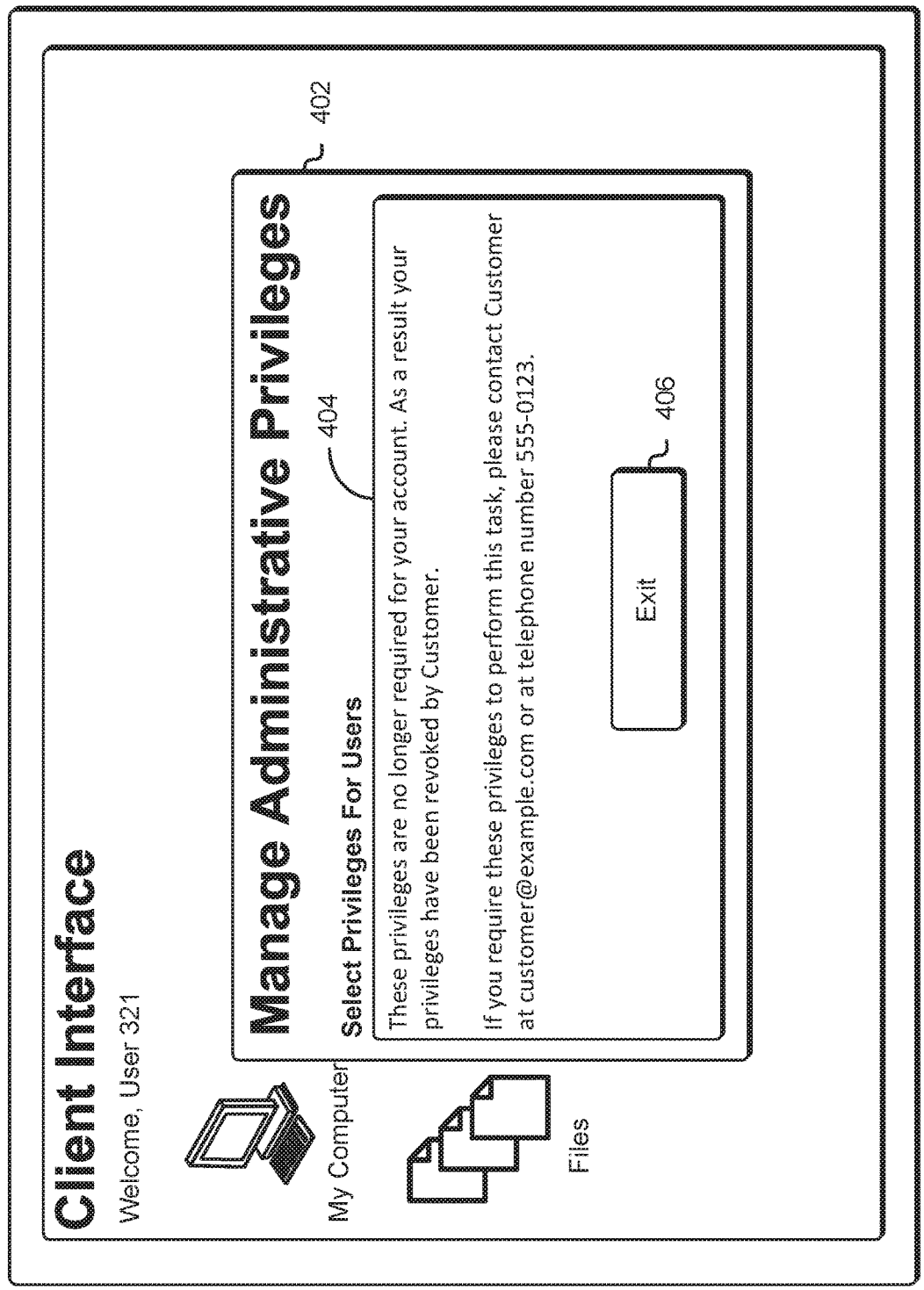
FIG. 4 shows an illustrative example of a system interface of a client device usable to present a notification to a user of the client device regarding modification to the user's privileges in accordance with an embodiment.

As noted above, if a user attempts to perform an action that is subject to a privilege that has been revoked via implementation of an approved privilege manifest, the agent on the client device may update an interface of the client device to present the user with a justification as to why the privilege was revoked by an administrator. Accordingly, FIG. 4 shows an illustrative example of a system interface 400 of a client device usable to present a notification to a user of the client device regarding modification to the user's privileges in accordance with an embodiment. In an embodiment, the agent on the client device monitors user activity to determine whether the user has requested performance of an action requiring a privilege that has been revoked as a result of implementation of an approved privilege manifest. For example, as illustrated in FIG. 4, a user may attempt to manage administrative privileges for itself and other users of the client device via an administrative action window 402. If the user's privileges enabling the user to manage these privileges have been revoked, the agent may update the administrative action window 402 to present a justification window 404.

The justification window 404 may comprise a graphical control component of a GUI (e.g., the system interface 400) that presents a notification to a user of the GUI indicating a justification for the user's privileges having been revoked by an administrator of the network. This justification may be provided by the administrator via the desired privilege manifest created using the system interface 300 described above in connection with FIG. 3. In an embodiment, the justification window 404 specifies information usable by the user of the client device to request temporary restoration of these privileges in order to perform the attempted set of actions. For example, the justification window 404 may specify contact information for the administrator, which the user may use to contact the administrator for restoration of the revoked privileges. In an embodiment, through the justification window 404, the user of the client device can submit a request to restore its privileges for a limited period of time. The user may specify the category of privilege that the user wishes to have restored, as well as a justification as to why this category of privilege needs to be restored for a limited period of time. The request for temporary restoration of the user's privileges may be transmitted to the administrator, which may determine whether to grant the user temporary privileges for performance of an action. Alternatively, the privilege management system may evaluate the user request in accordance with the level attribute defined by the administrator. Based at least in part on the level attribute assigned to the user and the privilege requested, the privilege management system may determine whether the temporarily grant the privilege to the user. Information from the request may be catalogued to enable the administrator to further refine privilege revocation events. The justification window 404 may include an exit button 406 to enable the user to exit the justification window 404 and return to the client interface.

Figure 5:
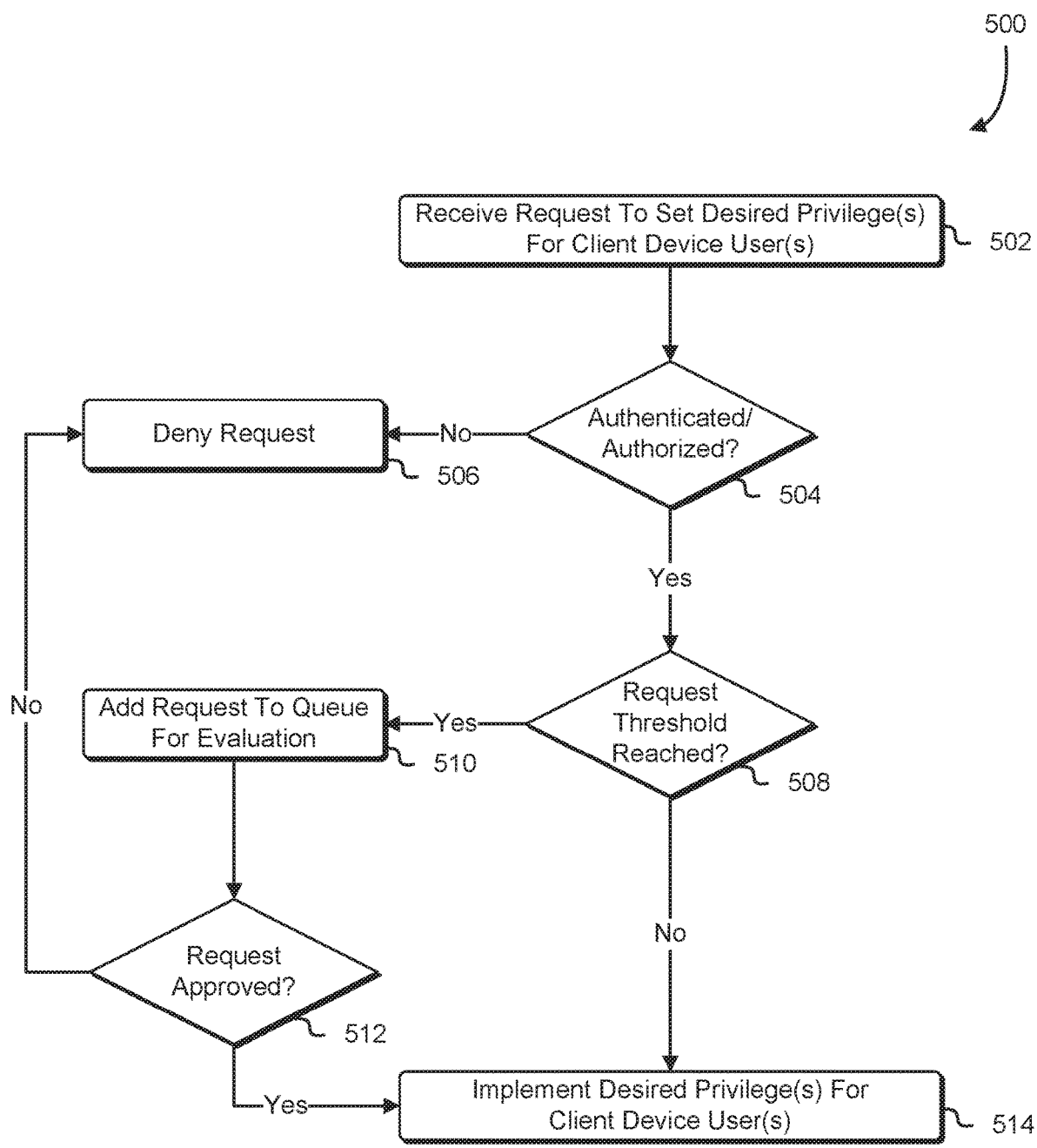
FIG. 5 shows an illustrative example of a process for implementing a set of desired privileges for client devices in response to receiving the set of desired privileges from an administrator in accordance with an embodiment.

As noted above, an administrator of a client network may define a desired set of privileges that are to be implemented on client devices within the client network. The administrator may provide this desired set of privileges via a desired privilege manifest, which may be submitted to a privilege management system for evaluation and implementation. In an embodiment, a velocity monitoring module of the privilege management system evaluates the desired privilege manifest to determine whether to add the desired privilege manifest to an approved privilege datastore for implementation. Accordingly, FIG. 5 shows an illustrative example of a process 500 for implementing a set of desired privileges for client devices in response to receiving the set of desired privileges from an administrator in accordance with an embodiment. The process 500 is performed by the aforementioned velocity monitoring module, although the process 500 may be performed by another computer system of the privilege management system, an application or module installed on a computer system of the privilege management system, and the like. It should be noted that certain operations illustrated in FIG. 5 may also be performed by a resource monitoring service, as described above in connection with FIG. 2.

At any time, the velocity monitoring module receives 502 a request from an administrator, via an API gateway, to set a desired set of privileges for one or more client device users. The request may include a desired privilege manifest, which may specify the set of privileges that should be applied to users of the one or more client devices. Additionally, in an embodiment, the request includes credential information usable to authenticate the administrator and determine whether the administrator is authorized to implement the set of desired privileges specified in the desired privilege manifest. The credential information may include a username/password pairs, one-time passwords, cryptographic information encrypted using a cryptographic key, and the like. In an embodiment, the velocity monitoring module evaluates the credential information to determine 504 whether the administrator can be authenticated and, if so, whether it is authorized to implement the set of desired privileges specified in the desired privilege manifest. If the administrator cannot be authenticated and/or is not authorized to submit a desired privilege manifest for implementation, the velocity monitoring module may deny 506 the request and transmit a notification to the administrator to indicate that the request could not be processed. To determine whether the administrator can be authenticated and is authorized to implement the desired set of privileges, the velocity monitoring module may obtain one or more policies applicable to the request. These policies may specify a set of permissions for the administrator and serve as an access control for the policy management service. Thus, if the administrator does not have the requisite permissions to access the policy management service for implementation of the desired set of privileges, the velocity monitoring module may deny the request.

If the administrator has been authenticated and it is determined that the administrator is authorized to implement the desired set of privileges, the velocity monitoring module may determine 508 whether a request threshold has been reached. For instance, administrators of the network may be subject to a limitation on the number of requests that may be submitted within a period of time for implementation of a set of desired privileges. In an embodiment, if the request threshold has been reached, the velocity monitoring module adds 510 the desired privilege manifest to a queue for evaluation by a resource monitoring service. The resource monitoring service may evaluate the request and determine whether the request can be processed. For example, the resource monitoring service may determine whether the request originated from an IP address of the administrator and, if so, direct the request to an administrator of the service provider to determine whether the request should be processed. Based at least in part on this analysis, the resource monitoring service may transmit a result to the velocity monitoring module. Thus, the velocity monitoring module may use this result to determine 512 whether the administrator's request has been approved.

If the resource monitoring service rejects the request, the velocity monitoring module may deny 506 the request. Further, the velocity monitoring module may transmit a notification to the administrator indicating that the request has been denied due to the call threshold having been breached. The notification may indicate a time at which the administrator may submit a new request to implement a desired set of privileges. However, if the request threshold has not been reached or the request has been approved by the resource monitoring service, the velocity monitoring module may implement 514 the desired set of privileges for the client device users. This may include storing the desired privilege manifest in the approved privilege datastore of the privilege management system. Further, the velocity monitoring module may transmit a notification to the privilege management system to initiate an analysis of the privileges currently implemented on the client devices to identify a set of differences between the currently implemented privileges and the desired set of privileges in the desired privilege manifest.

Figure 6:
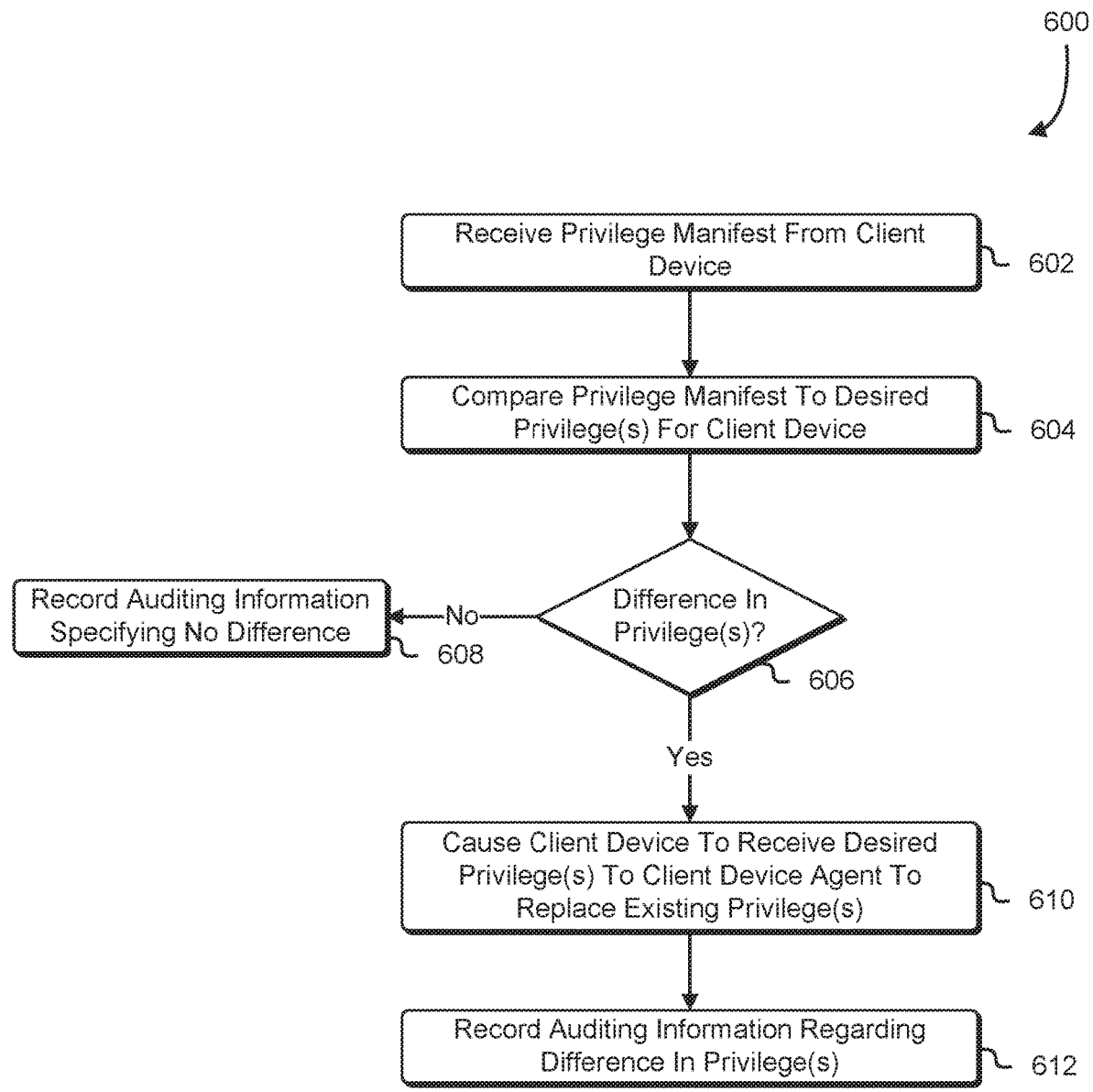
FIG. 6 shows an illustrative example of a process for implementing a set of desired privileges onto a client device as a result of the set of desired privileges being different from privileges identified in a privilege manifest from the client device in accordance with an embodiment.

As noted above, a privilege analysis module of the privilege management system may compare a privilege manifest from an agent on a client device to a desired privilege manifest that is to be implemented on to the client device to identify a set of differences. These differences may indicate a set of privileges that are to be revoked in order to be in compliance with the desired privilege manifest. Using these identified differences, the privilege analysis module may generate an approved privilege manifest that is provided to the agent on the client device. This may cause the agent to implement the approved privilege manifest, revoking or otherwise modifying any privileges as specified by an administrator of the client network. Accordingly, FIG. 6 shows an illustrative example of a process 600 for implementing a set of desired privileges onto a client device as a result of the set of desired privileges being different from privileges identified in a privilege manifest from the client device in accordance with an embodiment. The process 600 is performed by the aforementioned privilege analysis module or any other computer system, application, or process that is configured to compare privilege manifests to identify a set of differences and use this set of differences to generate an approved privilege manifest for implementation on a client device.

In an embodiment, each client device within a client network includes an agent that is configured to identify a set of privileges granted to users of the client device. The agent installed on the client device may include an application that monitors user accounts within the client device to identify privileges granted to each user of the client device. In an embodiment, the agent installed on the client device generates a privilege manifest, specifying, for each user of the client device, the privileges granted to the user. The agent may transmit this privilege manifest to the privilege analysis module of the privilege management system periodically or in response to a triggering event (e.g., the privilege management system indicates that a new desired privilege manifest applicable to the client device has been received, an event requiring review of currently applicable privileges has occurred, etc.). The privilege analysis module may receive 602 the privilege manifest from the client device.

In response to receiving the privilege manifest from the client device, the privilege analysis module obtains the desired privilege manifest from the approved privilege datastore. For instance, the privilege manifest may specify an identifier of the client device, which the privilege analysis module may use as input to a query to identify an entry in the approved privilege datastore corresponding to the client device. This entry may specify an identifier of a corresponding desired privilege manifest, which may specify the privileges that are to be implemented on the client device. The privilege analysis module may obtain this desired privilege manifest from the approved privilege datastore. Further, the privilege analysis module may compare 604 the privilege manifest from the client device to this desired privilege manifest to determine 606 whether there are any differences between these manifests. For instance, the privilege analysis module may identify any privileges specified in the privilege manifest that are to be revoked based at least in part on information specified in the desired privilege manifest.

If the privilege analysis module is unable to identify any differences between the privilege manifest and the desired privilege manifest (e.g., the desired set of privileges are implemented on the client device), the privilege analysis module may record 608 auditing information specifying that no difference was identified. This auditing information may be used to denote that privilege proliferation within the client device is at a minimum over a period of time during which the privilege manifest was analyzed. However, if the privilege analysis module identifies a set of differences between the privilege manifest and the desired privilege manifest, the privilege analysis module may generate an approved privileges manifest specifying the set of privileges to be implemented on the client device, as well as any privilege that are to be revoked for users or groups of users of the client device. The privilege analysis module may cause 610 the client device to receive this approved privileges manifest to the client device to provide the desired set of privileges that are to replace the existing privileges implemented on the client device. For instance, the agent on the client device may query the privilege management system to determine whether an approved privileges manifest is available for implementation on the client device. If an approved privileges manifest is available, the agent may obtain the approved privileges manifest. This may cause the agent on the client device to implement the desired set of privileges while revoking any privileges not specified in the approved privilege manifest. Alternatively, the privilege analysis module may provide the approved privileges manifest once it has been generated to the agent of the client device. The agent may receive the approved privileges manifest and implement the desired set of privileges specified therein.

In addition to providing the approved privilege manifest to the client device, the privilege analysis module may record 612 auditing information regarding the differences between the privileges specified in the desired privilege manifest and the privileges previously implemented on the client device. This information is usable to identify avenues for automatic revocation of privileges for other client devices in the network by the privilege management system. Further, this auditing information may be provided to the administrator of the client network to enable the administrator to identify the rate of privilege proliferation among the client devices in the network and to take any remedial actions as needed.

Figure 7:
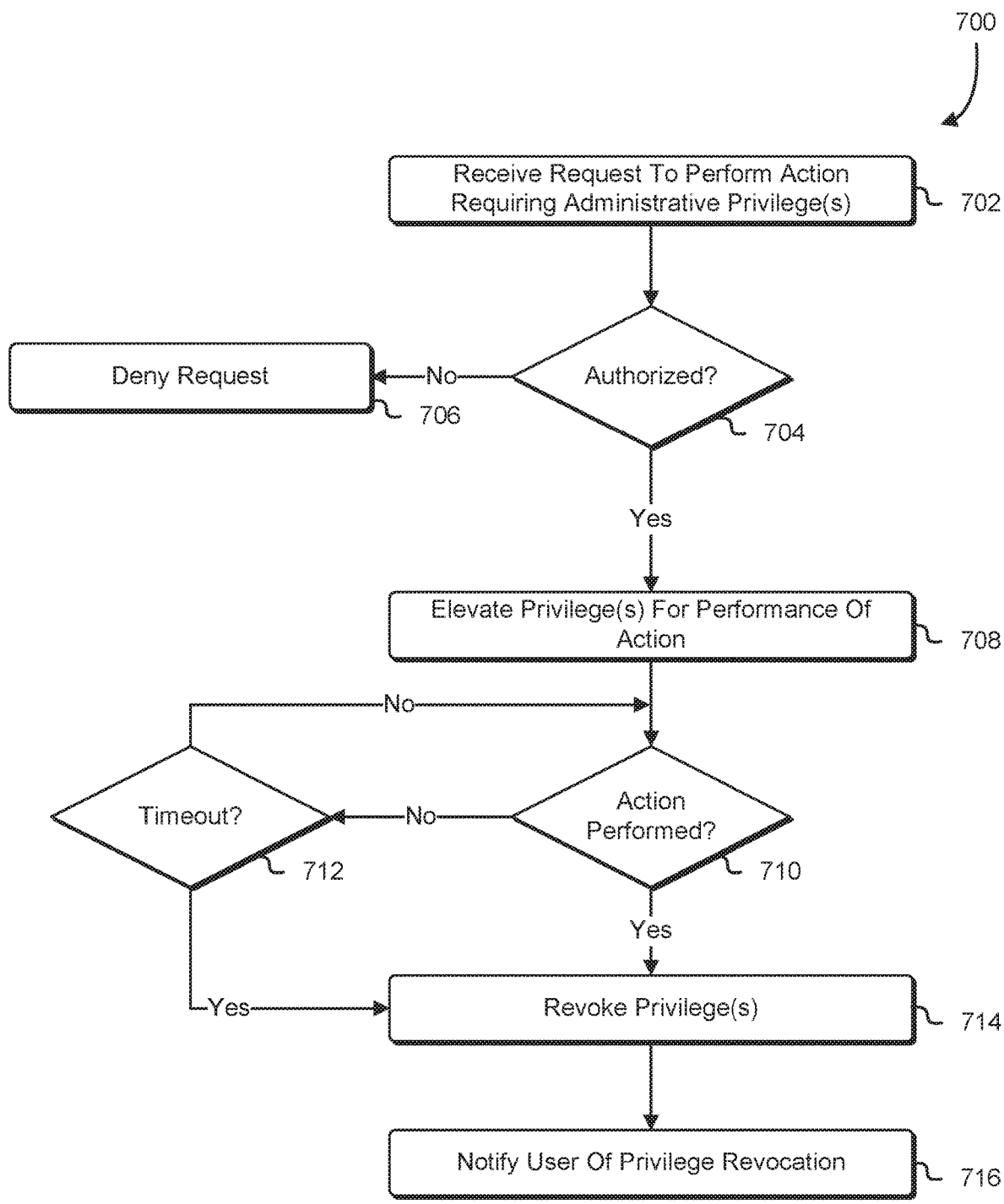
FIG. 7 shows an illustrative example of a process for temporarily elevating a set of privileges to enable a user of a client device to perform one or more actions in accordance with an embodiment.

As noted above, a user of a client device may submit a request to the privilege management system to have one or more privileges temporarily restored to enable the user to perform one or more actions. These privileges may have been previously revoked in response to receiving an approved privilege manifest from the privilege management system, which generates the approved privilege manifest based at least in part on a comparison between the privilege manifest from the client device and a desired privilege manifest defined by an administrator of a client network. If the user is authorized to perform the action requiring the elevated privileges, the privilege management system may elevate the user's privileges for a limited amount of time to enable the user to perform the action. Once the limited amount of time has elapsed, the privilege management system may revoke these elevated privileges. Accordingly, FIG. 7 shows an illustrative example of a process 700 for temporarily elevating a set of privileges to enable a user of a client device to perform one or more actions in accordance with an embodiment. The process 700 may be performed by the aforementioned privilege management system in conjunction with the agent on the client device, which may obtain the request from the user of the client device and provide the request to the privilege management system for processing. Further, the privilege management system may communicate with the agent on the client device to perform one or more operations, such as elevating privileges of the user and revoking other privileges of the user.

At any time, a user of a client device may attempt to perform an action on the client device that requires elevated privileges. These privileges may have been previously revoked in response to an agent of the client device receiving an approved privilege manifest from the privilege management system. If the user's privileges have been revoked due to a change stemming from the approved privilege manifest, the agent may notify the user that its privileges have been revoked and prompt the user to submit a request to be temporarily granted the requisite privileges to perform the action. In an embodiment, the user is prompted by the agent to supply a justification for needing the elevated privileges. This justification may be used to determine whether the user may be granted these elevated privileges for a limited period of time. If the user submits a request to the agent to obtain the elevated privileges, the agent may transmit the request to the privilege management system, which may receive 702 the request to perform an action requiring administrative or otherwise elevated privileges.

In response to the request, the privilege management system may determine 704 whether the user is authorized to perform the action. For instance, the privilege management system may transmit the request to the administrator, which may evaluate the request to determine whether the user should be granted the elevated set of privileges to perform the action. In an embodiment, the privilege management system transmits a request to a policy management service to obtain one or more policies applicable to the request.

These policies may specify the actions that the user may or may not perform on the client device. Thus, the privilege management system may utilize these policies to determine whether the user is authorized to perform the action. If the user is not authorized to perform the requested action, the privilege management system may deny 706 the request.

If the user is authorized to perform the action specified in the request, the privilege management system may transmit a notification to the agent on the client device indicating that the user may be granted the elevated privileges for a limited period of time. This may cause the agent on the client device to elevate 708 the set of privileges to enable the user to perform the action. As noted above, these privileges may be in effect for a limited period of time, defined by the privilege management system or by an administrator of the client network.

The agent on the client device may monitor the client device to determine 710 whether the action has been performed by the user. If the user has not performed the action, the agent may determine 712 whether the timeout period for the elevated privileges has elapsed. If the elevated privileges are still active and the timeout period has not elapsed, the agent may continue to monitor use of the client device to detect the user's performance of the action. In an embodiment, if the agent determines that the user has performed the action or the timeout period has elapsed for the elevated privileges, the agent revokes 714 the elevated privileges and provides 716 a notification to the user indicating that the elevated privileges have been revoked. The agent may update an interface of the client device to present this notification to the user.

Figure 8:
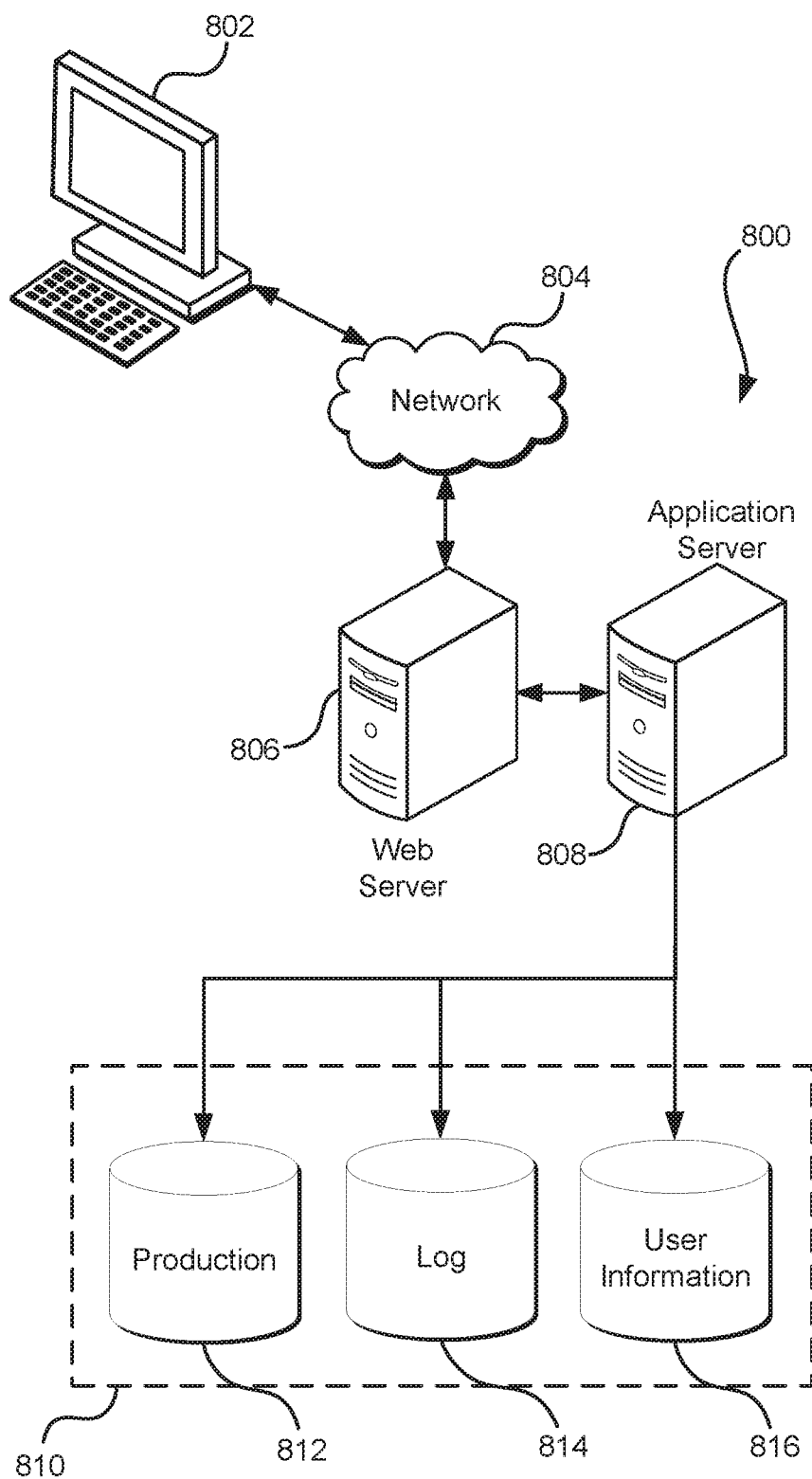
FIG. 8 shows an illustrative example of a system in which an embodiment can be implemented.

FIG. 8 illustrates aspects of an example system 800 for implementing aspects in accordance with an embodiment. As will be appreciated, although a web-based system is used for purposes of explanation, different systems may be used, as appropriate, to implement various embodiments. In an embodiment, the system includes an electronic client device 802, which includes any appropriate device operable to send and/or receive requests, messages, or information over an appropriate network 804 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly-addressable communications network, as the system includes a web server 806 for receiving requests and serving content in response thereto, although for other networks an alternative device serving a similar purpose could be used as would be apparent to one of ordinary skill in the art.

In an embodiment, the illustrative system includes at least one application server 808 and a data store 810 and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including, but not limited to, text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including, but not limited to, forms that are perceptible to the user audibly, visually and/or through other senses. The handling of all requests and responses, as well as the delivery of content between the client device 802 and the application server 808, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 810, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 812 and user information 816, which are used to serve content for the production side. The data store also is shown to include a mechanism for storing log data 814, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 810.

The data store 810, in an embodiment, is operable, through logic associated therewith, to receive instructions from the application server 808 and obtain, update or otherwise process data in response thereto and the application server 808 provides static, dynamic, or a combination of static and dynamic data in response to the received instructions. In an embodiment, dynamic data, such as data used in web logs (blogs), shopping applications, news services, and other such applications are generated by server-side structured languages as described herein or are provided by a content management system ("CMS") operating on, or under the control of, the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 802. Continuing with example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 800 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed (i.e., as a result of being executed) by a processor of the server, cause or otherwise allow the server to perform its intended functions.

The system 800, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols and such a system also includes a number of workstations running any of a variety of commercially-available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, and other virtual devices or non-virtual devices supporting virtualization capable of communicating via a network.

In an embodiment, a system utilizes at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that run one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C # or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, a non-transitory computer-readable storage medium store instructions and a main CPU execute some of the instructions while a graphics processor unit executes other instructions. In an embodiment, different components of a computer system have separate processors and different processors execute different subsets of the instructions.

Accordingly, in an embodiment, computer systems are configured to implement one or more services that singly or collectively perform operations of processes described herein and such computer systems are configured with applicable hardware and/or software that enable the performance of the operations. Further, a computer system that implement an embodiment of the present disclosure is a single device and, in another embodiment, is a distributed computer systems comprising multiple devices that operate differently such that the distributed computer system performs the operations described herein and such that a single device does not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    determining, based at least in part on a desired privilege state for a client device, a desired privilege manifest that reflects the desired privilege state, the desired privilege manifest specifying a notification justifying implementation of the desired privilege state;
    receiving, from the client device, a current privilege manifest, the current privilege manifest specifying a current privilege state of the client device;
    processing the current privilege manifest and the desired privilege manifest to identify a set of differences;
    providing the notification to the client device to cause the client device to present the notification in an interface; and
    causing, based at least in part on the set of differences and the notification, the client device to update the current privilege state to the desired privilege state.

2. The computer-implemented method of claim 1, wherein the method further comprises:
    receiving, from the client device, a request to implement a set of privileges to enable performance of an action, the set of privileges removed from the client device as a result of the client device updating the current privilege state to the desired privilege state;
    determining, based at least in part on information specified in the request, that the set of privileges can be granted for performance of the action;
    causing the client device to implement the set of privileges; and
    causing revocation of the set of privileges in response to performance of the action, the set of privileges.

3. The computer-implemented method of claim 1, wherein causing the client device to update the current privilege state to the desired privilege state includes revoking a set of privileges from the client device.

4. A system, comprising at least one computing device with memory storing computer-executable instructions that, upon execution, cause the system to implement one or more services, wherein the one or more services:
    obtain a first set of privileges implemented on a client device;
    obtain a desired privilege manifest, the desired privilege manifest specifying:
        a second set of privileges; and
        a notification justifying implementation of the second set of privileges;
    process the first set of privileges and the second set of privileges to identify a set of differences;
    provide the notification to the client device to cause the client device to present the justification; and
    cause, based at least in part on the set of differences, the client device to implement the second set of privileges.

5. The system of claim 4, wherein the one or more services further:
    utilize a characteristic of the client device to identify the desired privilege manifest; and
    utilize the desired privilege manifest to process the first set of privileges and the second set of privileges to identify the set of differences.

6. The system of claim 5, wherein the one or more services further transmit, in response to receiving the desired privilege manifest, a request to the client device to receive the first set of privileges.

7. The system of claim 4, wherein the one or more services further:
    receive, from the client device, a request to implement a privilege to enable performance of an operation;
    cause the client device to implement the privilege;
    receive an indication that the operation has been performed; and
    cause the client device to revoke the privilege.

8. The system of claim 4, wherein the one or more services further:
receive, from the client device, a request to implement a privilege to enable performance of an operation;
identify a time period during which the privilege is to be active on the client device;
cause the client device to implement the privilege; and
after the time period has elapsed, cause the client device to revoke the privilege.

9. The system of claim 4, wherein causing the client device to implement the second set of privileges further causes the client device to revoke at least one privilege of the first set of privileges.

10. The system of claim 4, wherein:
the characteristic of the client device is a unique identifier assigned to the client device, the unique identifier provided with the first set of privileges; and
the one or more services further use the unique identifier as input to a query of a datastore to identify an entry specifying the second set of privileges.

11. A non-transitory computer-readable storage medium having stored thereon executable instructions that, as a result of being executed by one or more processors of a computer system, cause the computer system to at least:
generate, based at least in part on a current privilege state of the computer system, a current privilege manifest associated with the current privilege state;
cause, based at least in part on a characteristic of the computer system and the current privilege manifest, a different computer system to generate a set of differences between the current privilege manifest and a desired privilege manifest associated with a desired privilege state to be implemented on the computer system, the desired privilege manifest providing a notification justifying implementation of the desired privilege state;
provide the notification to the computer system; and
process the set of differences to update the computer system to the desired privilege state.

12. The non-transitory computer-readable storage medium of claim 11, wherein the executable instructions further cause the computer system to:
receive a request to perform an operation;
identify additional privileges that, as a result of being implemented, enable performance of the operation;
implement the additional privileges; and
revoke the additional privileges in response to performance of the operation.

13. The non-transitory computer-readable storage medium of claim 11, wherein the executable instructions further cause the computer system to:
receive a request to perform an operation;
implement a set of additional privileges to enable performance of the operation, the set of additional privileges subject to an expiration time period; and
revoke the set of additional privileges in response to the expiration time period having elapsed.

14. The non-transitory computer-readable storage medium of claim 11, wherein the executable instructions that cause the computer system to generate the current privilege manifest further include instructions that cause the computer system to receive an indication from the different computer system that the desired privilege manifest has been obtained by the different computer system.

15. The non-transitory computer-readable storage medium of claim 11, wherein the executable instructions further cause the computer system to:
receive a request to perform an operation;
determine that the request is to be denied as a result of the computer system being updated to the desired privilege state; and
provide, in response to the request, a notification via an interface indicating a justification for revocation of privileges that, if implemented, enable performance of the operation.

16. The non-transitory computer-readable storage medium of claim 11, wherein the executable instructions further cause the computer system to transmit the current privilege manifest to the different computer system to cause the different computer system to generate the set of differences.

17. The non-transitory computer-readable storage medium of claim 11, wherein the characteristic of the computer system is a unique identifier associated with the computer system, the unique identifier usable by the different computer system to identify the desired privilege manifest.

18. The non-transitory computer-readable storage medium of claim 11, wherein the executable instructions that cause the computer system to process the set of differences further cause the computer system to:
receive, from the different computer system, an approved privilege manifest specifying the set of differences;
revoke any privileges of the computer system that are omitted from the approved privilege manifest; and
implement a set of privileges specified in the approved privilege manifest.

19. The computer-implemented method of claim 1, further comprising placing the desired privilege state in a queue.

20. The computer-implemented method of claim 1, further comprising:
determining whether a threshold on a number of requests within a period of time has been exceeded; and
upon a determination that the threshold has been exceeded, rejecting the implementation of the desired privilege state.

* * * * *